United States Patent [19]
Hock

[11] 3,833,302
[45] Sept. 3, 1974

[54] METHOD AND APPARATUS FOR THE AUTOMATIC PHOTOELECTRIC TRAPPING OF LOCAL CHANGES OF OPTICALLY EFFECTIVE OBJECT STRUCTURES

[75] Inventor: Fromund Hock, Wetzlar, Germany
[73] Assignee: Ernst Leitz GmbH, Wetzlar, Germany
[22] Filed: Aug. 20, 1973
[21] Appl. No.: 389,792

[30] Foreign Application Priority Data
Aug. 23, 1972   Germany............................ 2241443

[52] U.S. Cl................. 356/114, 356/118, 356/172
[51] Int. Cl. ......................................... G01n 21/40
[58] Field of Search ........... 356/114, 117, 118, 172, 356/169

[56] References Cited
UNITED STATES PATENTS
3,756,723   9/1973   Hock .............................. 356/114 X Primary Examiner—Ronald L. Wibert
Assistant Examiner—Paul K. Godwin
Attorney, Agent, or Firm—Krafft & Wells

[57] ABSTRACT

Means for the automatic photoelectric trapping of local changes of optically effective object structures, e.g., of markings or unhomogeneous objects (striae), in one or two coordinate directions, wherein:
a. a beam of light rays having a rotating plane of polarization is produced;
b. a reference signal is produced of which the phase is correlated with the phase of azimuth of said rotating plane of polarization;
c. the beam of light rays is split into two components having complementary polarization states;
d. these components are conducted to the object;
e. these components are converted into electric measuring signals with or without taking into account polarization according to the number of coordinates after the components have been influenced by the object being locked-in;
f. the measuring signals are combined with the reference signal for producing output signals, the arithmetic sign of which output signals being determined from the phase difference between the signals; and
g. the output signals are evaluated with respect to the amplitude and the arithmetic sign for obtaining the position of the object structures relative to the aiming axis of the beam components.

9 Claims, 4 Drawing Figures

METHOD AND APPARATUS FOR THE AUTOMATIC PHOTOELECTRIC TRAPPING OF LOCAL CHANGES OF OPTICALLY EFFECTIVE OBJECT STRUCTURES

CROSS REFERENCES TO RELATED APPLICATIONS

Applicant claims priority under 35 U.S.C. 119 for application Ser. No. P 22 41 443.3, filed Aug. 23, 1972 in the Patent Office of the Federal Republic of Germany.

The disclosure of the copending application of the present inventor and entitled "Optical Method and Apparatus for Measuring the Relative Displacement of a Diffraction Grid" and filed on the same date as the present application is incorporated herein.

In addition, the disclosure of the application of Fromund Hock et al., Ser. No. 383,780 filed July 30, 1973 and having the title "Method and Apparatus for the No-Contact Measurement of Velocities, Changes in Relative Position, or Displacement Paths" is incorporated herein.

BACKGROUND OF THE INVENTION

This invention relates to the automatic photoelectric trapping of local changes of optically effective object structures, e.g., of markings or unhomogeneous objects (striae), in one or two coordinate directions.

A photometric apparatus for the alignment of, for example, a sighting telescope to an inherently luminous or illuminated object in accordance with two coordinates is known from German Utility Model 1,792,220, wherein simultaneously two comparisons of respectively two mutually correlated, separately present light fluxes are effected, and wherein the light fluxes are converted into analogous electric signals by the periodic illumination of a common photoelectric receiver. By means of this device, a geometric-optical splitting of the object image is conducted. The chronological course of the signals produced during the alternating exposure of the receiver is determined by the geometric shape of the light-guiding elements. The evaluation is accomplished by way of an amplitude comparison of the two partial light fluxes.

Furthermore, a precision measuring arrangement is known from German Unexamined Laid-Open Application 2,017,400, wherein a light spot for detecting or tracking the fringes defining the distances to be measured executes, in addition to a relative motion with reference to the measuring object, which serves as the basis for the measurement, also a wobbling motion for increasing the measuring accuracy. This is achieved by an arrangement constructed, for example, as an electrooptical light deflecting means, which directs the measuring beam periodically without traversing intermediate positions alternatingly to two or more adjacent discrete points of the measuring object, and by at least one light-sensitive element which converts the light transmitted and/or reflected by the measuring object into electric signals.

A disadvantage in these devices is the cost expenditure necessary for optical switches, beam-dividing, as well as beam-influencing optical components.

SUMMARY OF THE INVENTION

Having in mind the limitations of the prior art, it is an object of the present invention to provide means for constructing a rapidly operating sighting device of high local resolution, wherein electrooptical modulators and their driving generators are no longer required.

This object is attained according to the present invention, by producing a beam of light rays having a rotating plane of polarization, which is split up into two components exhibiting differing polarization directions. The intensities of these beams consequently vary in pairs and periodically in push-pull relationship to each other. These components are conducted simultaneously to the measuring object, as well as also to at least one photoelectric reference receiver stage. These components are converted partially prior to as well as after being influenced by the object structure to be locked in, into electric reference and/or measuring signals. These measuring signals are rectified with respect to the reference signals in phase dependence, and the beam of light rays exiting from the source is shifted by means of the signals resulting after the rectification, via at least one optically deflecting means disposed in the beam path, until the desired object structure has been locked in.

BRIEF DESCRIPTION OF THE DRAWINGS

The invention is best described by reference to embodiments shown schematically in the appended drawings, wherein.

DESCRIPTION OF THE PREFERRED EMBODIMENTS

Figure 1:
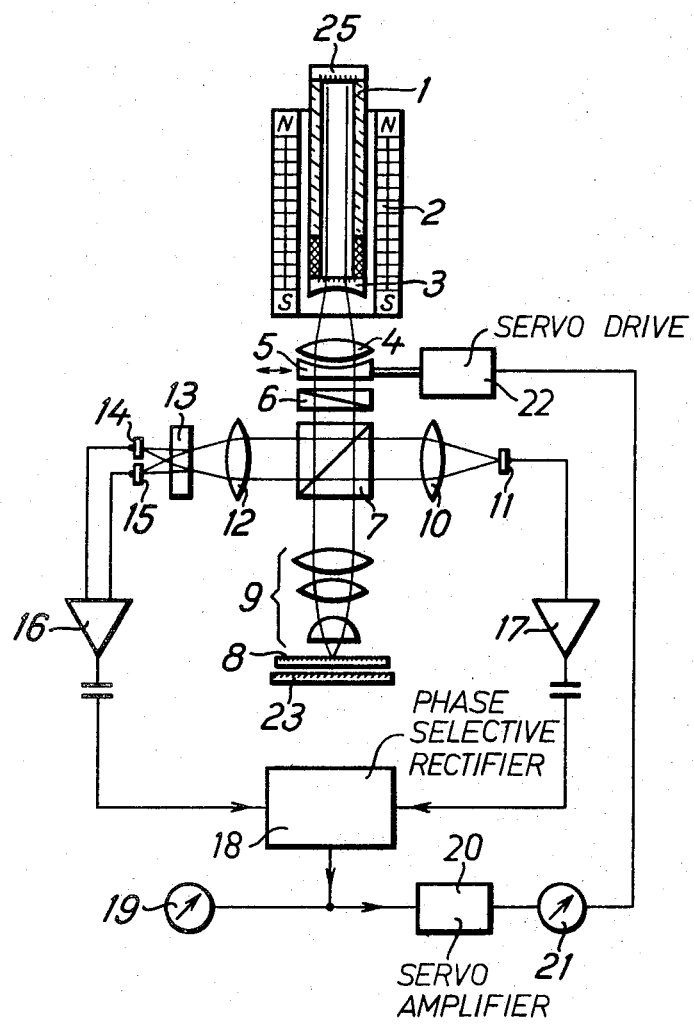
FIG. 1 shows a device for fringe trapping in one coordinate direction.

FIG. 1 shows a laser 1, the beam of which has a rotating polarization plane. This beam passes through a beam expander comprising lenses 3, 4. The frequency of rotation of the polarizing plane is determined by the amount of the field strength of a magnetic device 2. Subsequently to the beam expander 3, 4, the laser beam passes through a transversely slideable lens 5 so that its axis is able to be inclined. Thereafter, the beam is split up, by means of a Wollaston prism 6 which is rotatable in order to elect the measuring direction, into two components having orthogonoal polarization directions. After passing through a geometric beam splitter 7 and a microobjective 9 comprising three lenses, these components produce two scanning points on the transilluminated object 8 constructed as a masked plate. These spots light up alternatingly due to the rotation of the polarizing plane of the laser beam. The light proportion transmitted by the masking structures of the object 8 is reflected on an auxiliary mirror 23 and passes once again through the object 8, the microobjective 9, and the beam splitter 7, via a collecting optic 10, to a photoelectric receiver 11. The splitter 7 furthermore divides a reference portion from the beams emanating from the laser 1, this portion passing, via an optical collector 12 and a polarizing calcite splitter plate 13 to two photoelectric receivers 14, 15 for the purpose of separating the components. In the selection of the measuring direction, the splitter plate 13 is rotated in synchronism with the Wollaston prism 6. The output signals of the photoelectric receivers 14, 15 pass, via a differential amplifier 16, to a phase-selective rectifier 18 such as disclosed in Frequenz, Vol. 17 (1963) No. 4, p. 133 and the output signals of the receiver 11 pass to the same rectifier via an amplifier 17. The output signals of this rectifier are conventionally fed to a target indicator 19, a servo amplifier 20, a measurement indicator 21, and a drive 22 for the transversely slideable lens 5.

If object structures are disposed in the zone of the division path of the scanning points which effect a different transmission for the two beam components, on the masked plate 8, then discriminator signals are produced in the receiver 11, the further processing of which is accomplished in connection with the reference signal emitted by the amplifier 16, in a conventional manner.

Figure 2:
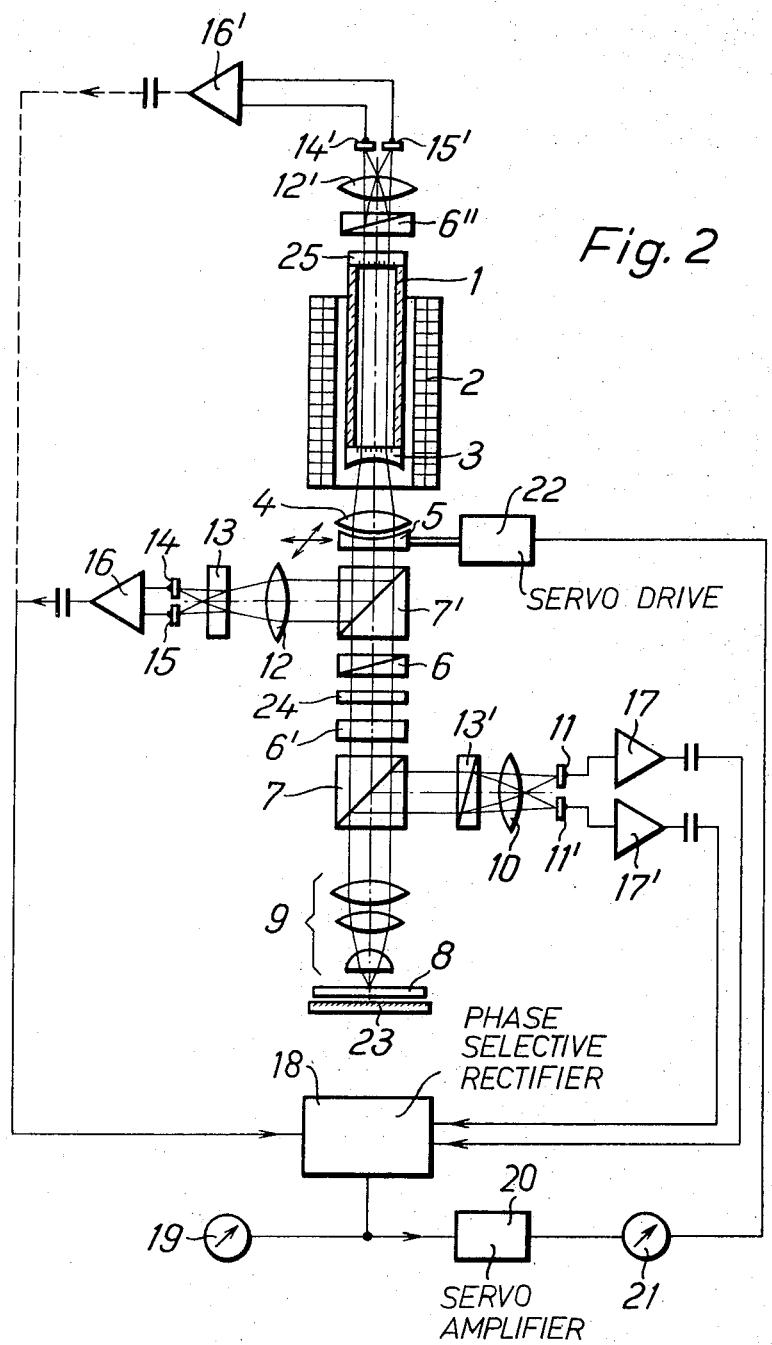
FIG. 2 shows a device for fringe trapping in two coordinate directions.

FIG. 2 shows a modification of the above-described arrangement for fringe capture in two coordinate directions. In this system, identical reference numerals point to corresponding components. In order to now obtain four scanning points, a second Wollaston prism 6' is provided in addition to the Wollaston prism 6, this second prism being turned with respect to the first preferably by 90°. This would, first of all, displace the two already present scanning points only vertically to their connection line, and thus result again in only two beams. In order to obtain four scanning points, the two beams directed to the second prism 6' must already contain inherently two orthogonally polarized components. For this reason, a quarter-wave plate 24 is furthermore disposed between the two prisms 6, 6', which plate now circularly polarizes the two linearly polarized beams. By an appropriate rotation of this quarter-wave plate 24, its effect can be eliminated. This is essential when changing over from two-coordinate to one-coordinate trapping. Of the four scanning points, two are always alternatingly illuminated together, lying on the same side of the rectangle. By means of the Wollaston prism 6', the circular polarization is again converted into linear polarization. After passing through the splitter 7, the microobjective 9, and the object 8, respectively, two equally polarized measuring beams pass to respectively one associated photoelectric receiver 11, 11', the output signals of which are fed, via amplifiers 17, 17', to the phase-selective rectifier 18. The associated reference signal for characterizing the instantaneous position of the polarizing plane is obtained either by branching off light by means of a neutral splitter prism 7', or by evaluating the ray leaving the laser 1 at the rear through the window 25. In this procedure, the light beams are conducted, by means of a calcite plate 13 or 6'' and a collecting lens 12 or 12', to respectively, two photoelectric receivers 14, 15 and 14', 15'.

Figure 3:
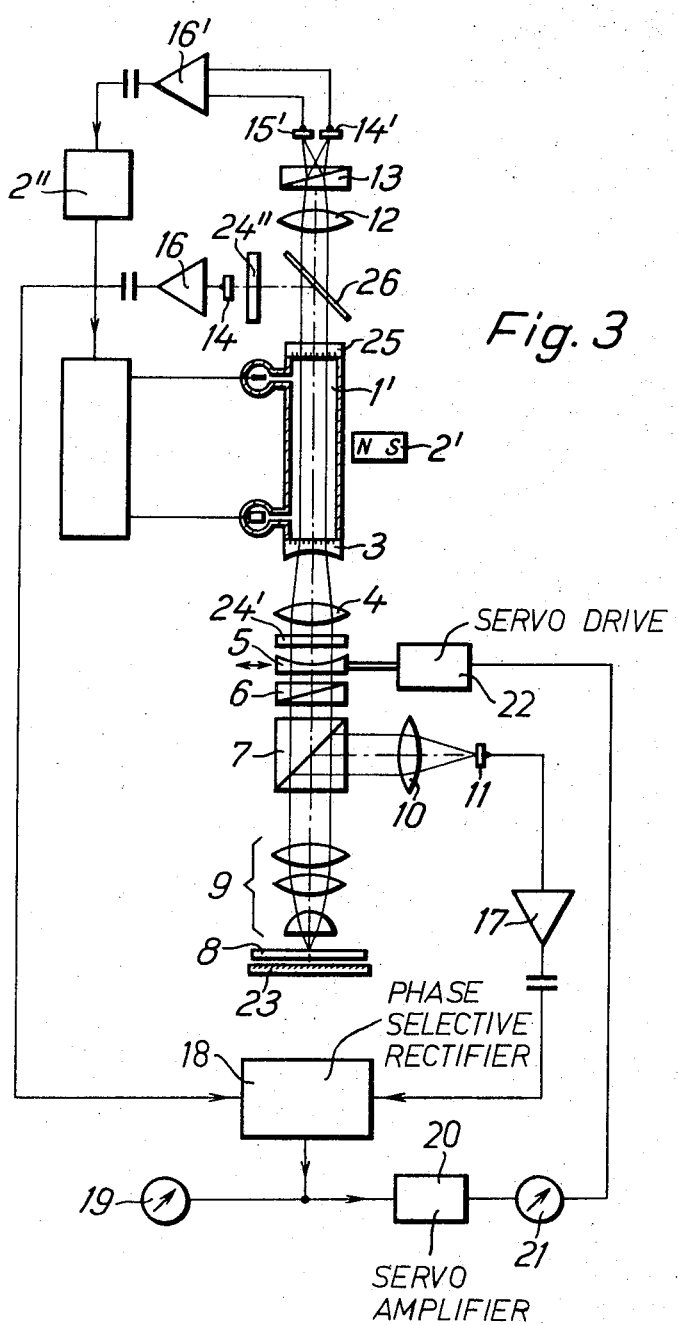
FIG. 3 shows a device with a two-mode $TEM_{00\phi}$ laser.

FIG. 3 shows a modification of the arrangement shown in FIG. 1. This system serves for fringe capture in one coordinate direction and has a two-mode $TEM_{00\phi}$ laser 1'. The state of the art of $TEM_{00\phi}$ mode lasers is disclosed in U.S. Pat. No. 3,694,768. Here again, the same reference numerals denote components identical to those of FIG. 1. The laser 1' is provided with a frequency stabilizing circuit 2'' which maintains the two laser modes at the same energy. Besides, a transversely mounted permanent magnet 2' prevents the polarizing angles of the two modes from changing and/or rotating. Two components circular in opposite directions are produced from these two orthogonally linearly polarized components by means of a correspondingly oriented quarter-wave plate 24'. These components are combined to the desired beam with rotating polarization. The reference signal is produced in this arrangement by a glass plate 26 oriented under the Brewster angle to the laser beam and under 45° to the mode polarizations and by an analyzer 24'' in combination with a photoelectric receiver 14 and amplifier 16.

Figure 4:
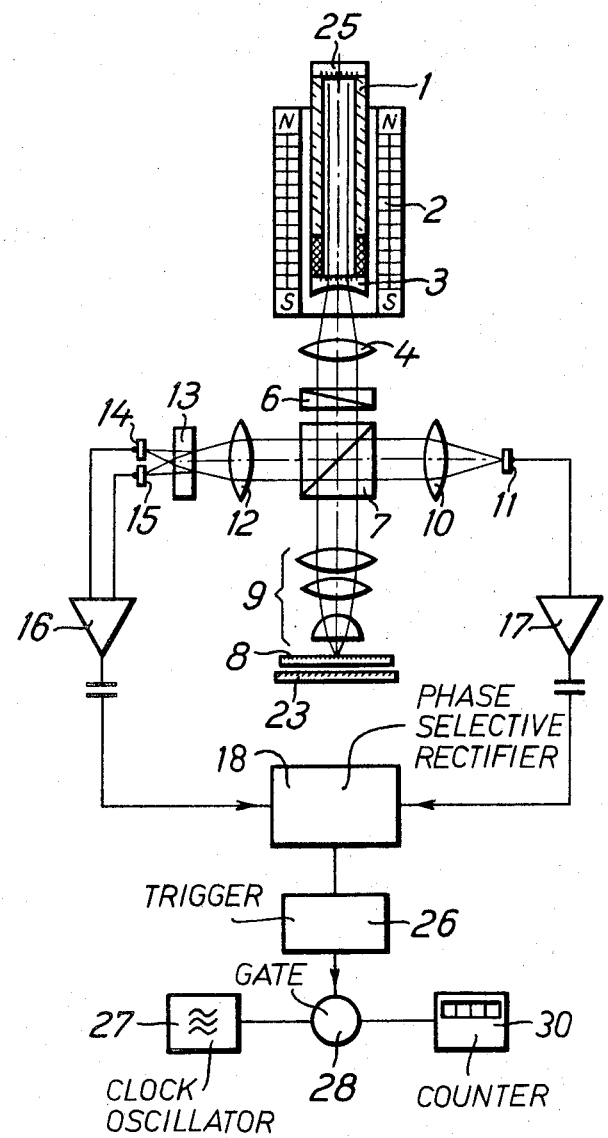
FIG. 4 shows a device according to FIG. 1 with evaluation of a zero-axis crossing.

In FIG. 4, reference numerals coinciding with those in FIG. 1 denote components having the same function. In contrast to the device of FIG. 1, FIG. 4 does not provide for an additional guidance of the beam path by means of driver stage 22 and slideable lens 5. Rather, the position of a measured fringe is determined by the zero-axis crossing of the output signal of the rectifier 18. For this purpose, a trigger 26 is connected after the rectifier 18, this trigger driving a gate 28. A counter 30 with an indicator 29 counts the signal frequency of a clock oscillator 27 until the trigger 26 applies a stop pulse to the gate 28 lying between the oscillator 27 and the counter 29. The digit then indicated at the counter 29 corresponds to the position of the measured fringe at the instant of the stop pulse.

I claim:

1. Method for the automatic photoelectric trapping of local changes of optically effective object structures in one or two coordinate directions, comprising:
   a. producing from a source a beam of light rays having a rotating plane of polarization;
   b. producing a reference signal of which the phase is correlated with the phase of azimuth of said rotating plane of polarization;
   c. splitting said beam into two components having complementary polarization states;
   d. conducting said components to said objects;
   e. converting said components into electric measuring signals with or without taking into account polarization according to the number of coordinates, after said components have been influenced by said object being locked-in;
   f. combining said measuring signals with said reference signal for producing output signals, the arithmetic sign of said output signals being determined from the phase difference between said signals; and
   g. evaluating said output signals with respect to the amplitude and the arithmetic sign for obtaining the position of said object structures relative to the aiming axis of said beam components.

2. Method for the automatic photoelectric trapping of local changes of optically effective object structures in one or two coordinate directions, comprising:
   a. producing from a source a beam of light rays having a rotating plane of polarization;
   b. producing a reference signal of which the phase is correlated with the phase of azimuth of said rotating plane of polarization;
   c. splitting said beam into two components having complementary polarization states;
   d. conducting said components to said object;
   e. converting said components into electric measuring signals with or without taking into account polarization according to the number of coordinates, after said components have been influenced by said object being locked-in;

f. combining said measuring signals with said reference signal for producing output signals, the arithmetic sign of said output signals being determined from the phase difference between said signals; and g. shifting said beam of light rays emanating from said source by means of said output signals via at least one optically deflecting means disposed in the beam path to lock in said object.

3. Apparatus for the automatic photoelectric trapping of local changes of optically effective object structures, in one or two coordinate directions comprising:

a. means for generating a beam of light rays having a rotating plane of polarization;
b. means for splitting said beam into two components having differing polarization directions;
c. means for conducting said components simultaneously to the object and to at least one photoelectric reference receiver stage;
d. means for converting said components into electric reference or measuring signals partially prior to and after being influenced by said object being locked in;
e. means for rectifying said measuring signals with phase selection regarding said reference signals; and
f. means for shifting said beam by means of the signals derived from the rectification via at least one optically deflecting means disposed in the beam path to lock in said object.

4. The apparatus of claim 3, wherein said means for generating a beam of light is a laser (1) having a frequency-dividing magnetic unit (2), followed by a beam expander (3,4) and an optically deflecting means (5), said means for splitting is a beam-splitting polarizing component (6), as well as a beam splitter (7), wherein said beam splitter (7) is followed in the direction toward the object (8), by a microobjective (9) disposed in front of an auxiliary mirror (23) and wherein the second exit surface of said beam splitter is followed, via a collecting optic (10), by said means for converting comprising a photoelectric receiver (11) with an associated amplifier (17), as well as wherein the third exit surface of said splitter is followed, via a further collecting optic (12) and a polarizing splitter (13), by two photoelectric receivers (14,15), the outputs of which are connected to the inputs of a differential amplifier (16); and the outputs of the amplifiers (16,17) are connected to said means for rectifying comprising a phase-selective rectifier (18), followed by an indicating instrument (19); that furthermore the phase-selective rectifier (18) is followed by said means for shifting comprising a servo amplifier (20), a further measuring device (21) as well as a driver stage (22) for an optically deflecting means (5).

5. The apparatus of claim 3, wherein said means for generating a beam of light is a laser (1) having a frequency-dividing magnetic unit (2), followed by a beam expander (3,4) and an optically deflecting means (5), said means for splitting is a beam-splitting polarizing component (6), as well as a beam splitter (7), wherein said beam splitter (7) is followed in the direction toward the object (8) by a microobjective (9) disposed in front of an auxiliary mirror (23) and wherein the second exit surface of said beam splitter is followed, via a collecting optic (10), by said means for converting comprising a photoelectric receiver (11) with an associated amplifier (17), as well as wherein the third exit surface of said splitter is followed, via a further collecting optic (12) and a polarizing filter, a photoelectric receiver, the output of which is connected to the input of a one-channel amplifier; and that the output of said amplifier is connected to said means for rectifying comprising a phase-selective rectifier (18), followed by an indicating instrument (19); that furthermore the phase-selective rectifier (18) is followed by said means for shifting comprising a servo amplifier (20), a further measuring device (21), as well as a driver stage (22) for an optically deflecting means (5).

6. The apparatus of claim 3, wherein said means for generating a beam of light is a laser (1) having a frequency-dividing magnetic unit (2), followed by a beam expander (3,4) and an optically deflecting means (5), said means for splitting is a beam-splitting polarizing component (6), as well as a quarter-wave plate (24), wherein said quarter-wave plate (24) is followed by a second polarizing component (6'), which is orthogonal to the first component and has a beam-splitting action, as well as by a beam splitter (7), the latter being followed, in the direction toward the object (8) by said means for conducting comprising, disposed in front of an auxiliary mirror (23), a microobjective (9), and wherein the second exit surface of this splitter is followed, via a polarizing splitter (13') and a collecting optic (10) by said means for converting comprising two photoelectric receivers (11, 11') with two associated amplifiers (17, 17'); a second exit surface of a second neutral splitter (7') inserted between said components (5) and (6) is followed, via a collecting optic (12) and a polarizing splitter (13), by two photoelectric receivers (14, 15), the outputs of which are connected to the inputs of a differential amplifier (16); and wherein the outputs of the amplifiers (16, 17, 17') are connected with said means for rectifying comprising a phase-selective rectifier (18), followed by an indicating instrument (19); and wherein furthermore said phase-selective rectifier (18) is associated, with said means for shifting via a servo amplifier (20), a further measuring unit (21), as well as a driving stage (22) for an optically deflecting means (5).

7. The apparatus of claim 6, wherein said laser (1) has a rear exit (25) followed by a beam-splitting polarizing component (6''), a collecting optic 12'), and thereafter two photoelectric receivers (14', 15'), the outputs of which are connected to the inputs of a differential amplifier (16'); and wherein, in place of the amplifier (16), the amplifier (16') is connected to the phase-selective rectifier (18).

8. The apparatus of claim 3, wherein said means for generating a beam is a two-mode $TEM_{oo\,q}$ laser (1') with a frequency stabilizing circuit (2'') and a magnetic mode stabilizing unit (2'), the output of which laser (1') is associated with a quarter-wave plate (24').

9. The apparatus of claim 4, wherein said phase-selective rectifier (18) is followed by a trigger (26) which controls a gate (28), wherein the gate (28) is disposed between a clock oscillator (27) and a counter (30).

* * * * *